United States Patent [19]

Shiraishi et al.

[11] Patent Number: 5,260,190

[45] Date of Patent: Nov. 9, 1993

[54] AUTORADIOGRAPHIC PROCESS

[75] Inventors: Hisashi Shiraishi, Minami-ashigara; Junji Miyahara; Hisatoyo Kato, both of Kaisei, all of Japan

[73] Assignee: Fuji Photo Film Co., Ltd., Kanagawa, Japan

[21] Appl. No.: 378,509

[22] Filed: Jul. 6, 1989

Related U.S. Application Data

[63] Continuation of Ser. No. 253,323, Oct. 3, 1988, abandoned, which is a continuation of Ser. No. 104,533, Sep. 30, 1987, abandoned, which is a continuation of Ser. No. 837,037, Mar. 6, 1986, abandoned, which is a continuation of Ser. No. 549,417, Nov. 7, 1983, abandoned.

[30] Foreign Application Priority Data

Nov. 5, 1982 [JP] Japan .................. 57-193418
Nov. 5, 1982 [JP] Japan .................. 57-193419
Feb. 24, 1983 [JP] Japan .................. 58-30604

[51] Int. Cl.⁵ .................. C12Q 1/68; G03C 5/16; G01N 33/566
[52] U.S. Cl. .................. 435/6; 436/57; 436/94; 935/77; 250/581; 250/484.2
[58] Field of Search .................. 424/1.1; 250/327.1, 250/303, 362, 361 C, 327.2, 484.1; 436/504, 542, 57, 94; 935/77; 435/6

[56] References Cited

U.S. PATENT DOCUMENTS

| 4,239,968 | 12/1980 | Kotera et al. ............ 250/327.1 |
| 4,389,670 | 6/1983 | Davidson et al. |
| 4,617,468 | 10/1986 | Shiraishi et al. ............ 250/484.1 |
| 4,734,581 | 3/1988 | Hashiue ............ 250/484.1 X |
| 4,803,359 | 2/1989 | Hosoi et al. ............ 250/327.2 |
| 4,852,050 | 7/1989 | Shiraishi et al. ............ 364/414 |
| 4,865,967 | 9/1989 | Shiraishi et al. ............ 435/6 |

FOREIGN PATENT DOCUMENTS 0056638 7/1982 European Pat. Off. ......... 250/327.1

OTHER PUBLICATIONS

European Search Report, Application No. EP 83 11 0984.
Laskey, R. A. et al., *FEBS Letters*, vol. 82, No. 2, pp. 314-316 (1977).
Swanstrom et al., *Analytical Biochemistry*, vol. 86, pp. 184-192 (1978).

*Primary Examiner*—Richard D. Lovering
*Assistant Examiner*—John M. Covert
*Attorney, Agent, or Firm*—Sixbey, Friedman, Leedom & Ferguson

[57] ABSTRACT

An autoradiographic process for obtaining information on one or two dimensional location of radioactively labeled substances contained in a sample selected from the group consisting of tissue of an organism and a medium containing tissue of an organism and/or substances such as DNA originating from an organism, which comprises:

placing said sample and a stimulable phosphor sheet having a phosphor layer comprising a stimulable phosphor dispersed in a binder together in layers for a certain period to cause said phosphor sheet to absorb at least a portion of radiation energy emitted by the radioactively labeled substances in said sample;

scanning said phosphor sheet with an electromagnetic wave to release at least a portion of radiation energy stored in said phosphor sheet as stimulated emission; and detecting the stimulated emission to obtain locational information on the radioactively labeled substances in the sample.

9 Claims, 2 Drawing Sheets

(a)

(b)

(c)

(d)

AUTORADIOGRAPHIC PROCESS

This application is a continuation of U.S. patent application Ser. No. 253,323, filed Oct. 3, 1988, which is a continuation of U.S. patent application Ser. No. 07/104,533, filed Sept. 30, 1987, which was a continuation of U.S. patent application Ser. No. 06/837,037, filed Mar. 6, 1986, which was a continuation of U.S. patent application Ser. No. 06/549,417, filed Nov. 7, 1983 all of which are now abandoned.

BACKGROUND OF THE INVENTION

1. Field of the Invention

The present invention relates to an autoradiographic process and kits for said process.

2. Description of the Prior Arts

There has been heretofore known a radiographic process termed "autoradiography" or "radioautography" comprising steps of: introducing a radioactively labeled substance into an organism; placing the organism or a part of tissue of the organism (that is, a sample or specimen) and a radiographic film such as a high sensitivity type X-ray film together in layers for a certain period of time to expose said film thereto; and obtaining the locational information on the radioactively labeled substance in said specimen from the resolved pattern of the film. The autoradiography has been utilized, for example, to investigate the pathway and state of metabolism, absorption, and excretion of the substance introduced in the organism in detail. Such autoradiography is described, for instance, in the following literature: Method in Biochemical Experiment, Volume 6, Method in Tracer Experiment I, 271-289, "8. Autoradiography" by Toru Sueyoshi & Akiyo Shigematsu (Tokyo Kagaku Dozin Ltd., 1977).

The autoradiography has been also utilized to obtain locational information on the radioactively labeled substances present on a medium containing radioactively labeled tissue of an organism and/or the radioactively labeled substances originating from an organism. For instance, there is known an autoradiography comprising steps of: labeling organism-originating biopolymers such as proteins or nucleic acids with a radioactive element; resolving the mixture of the radioactively labeled biopolymers, derivatives thereof, or cleavage products thereof on a gel support (medium) through a resolving process such as gel electrophoresis; placing the gel support and a high sensitivity X-ray film together in layers for a certain period of time to expose said film to the gel support, developing said film, obtaining the locational information of the radioactively labeled substances from the developed film, and then performing the identification of the polymeric substances, determination of molecular weight of the polymeric substances and isolation of the polymeric substances based on the obtained locational information.

Recently, the autoradiography has been effectively used especially for determining the base sequence of a nucleic acid such as DNA. Therefore, the autoradiography is thought to be a very useful means in the field of structural determination of polymeric substances originating from organisms.

Maxam-Gilbert method and Sanger-Coulson method are known as methods for sequencing DNA utilizing autoradiography. In these methods, the base sequence of DNA is determined by geniously utilizing the characteristic structure of DNA that DNA is in the form of a double helix structure, which consists of two chain molecules stabilized through hydrogen bonding between two bases on each chain molecule, and that the base, which comprises a part of constitutional unit of DNA, is limited to only four, which are adenine (A), guanine (G), cytosine (C), and thymine (T), and that the hydrogen bonding between each constituting base unit comprises only two combinations, namely, G-C and A-T.

For instance, Maxam-Gilbert method is performed by the procedure described below.

A group containing a radioactive isotope of phosphor (P) is attached to a chain molecule of DNA or a DNA fragment at one end to be sequenced to prepare a radioactively labeled substance, and then the radioactively labeled DNA molecule is specifically cleaved at the specific constitutional unit containing a certain base by a certain chemical reaction. This reaction is called a "base specific cleavage reaction". Then a mixture of numerous cleavage products of the DNA or DNA fragment, which is formed base-specifically by the above-mentioned procedure is resolved through gel electrophoresis to obtain a resolved pattern, in which numerous cleavage products are resolved depending on the molecular weight, which is approximately proportional to the length of molecule of the cleavage products, to form a band spectrum, or a ladder pattern (the bands are not visible) on the gel. The electrophoresed gel is subsequently placed in contact with a high sensitivity X-ray film for a long time at a low temperature, whereby the X-ray film is exposed to the resolved pattern, to cause the radiation from the respective bands containing the radioactively labeled cleavage products to form a latent image of the resolved pattern thereon. The X-ray film having the latent image thereon is developed to obtain a visible band spectrum consisting of a large number of bands which corresponds to the resolved pattern. Then the distance of the each band of the base-specifically cleaved product from the starting position of electrophoresis, which corresponds reversibly to the sequential position from the radioisotopically labeled terminal end of the DNA molecule is obtained from the developed film. Thereafter, by arranging the bands of the base specific cleavage products of four bases in accordance with the distance obtained by the above-mentioned procedure, the sequential position of each base from the radioisotopically labeled end of the chain molecules is read by referring to the applied based specific chemical reaction.

Maxam-Gilbert method summarized above is described in detail in the following literature: METHODS IN ENZYMOLOGY, VOL., 65, PART I (ACADEMIC PRESS, NEW YORK LONDON TORONTO SIDNEY SAN FRANCISCO, 1980)

Sanger-Coulson method also utilizes the specific structure of DNA and is employable for determining the sequence of bases in DNA by the use of DNA synthesis enzyme, gel electrophoresis, and the autoradiography techniques.

The characteristics and procedures of Sanger-Coulson method as well as those of the above-mentioned MaxamGilbert method are briefly described in the following literature: "Reading the genetic information in the original language. A surprising method for sequencing the bases of DNA" written in Japanese by Kinichiro Miura, Modern Chemistry, Sep. 1977, pp. 46-54 (Tokyo Kagaku Dozin Ltd., Japan).

As described above, the autoradiography is a very useful method for obtaining one or two dimensional information on the location of the radioactively labeled substances present in a sample such as tissue of an organism and a medium containing substances or tissues originating from an organism. Thus, the autoradiography is advantageously applicable, for instance, to the investigation of the pathway and state of metabolism, absorption, and excretion of a substance introduced in an organism, as well as to the determination of the structure of biopolymer.

Nevertheless, such useful autoradiography is not free from several drawbacks in the practical use.

In the first place, a long period of time and a complicated operations are required for performing the procedure of exposing a radiographic film such as a high sensitivity X-ray film to a radioactive element-containing sample such as the autoradiogram, an organism dosed with radioactively labeled substance or a portion of the tissue of the dosed organism through placing the sample and the film together in layers so as to visualize the position of the radioactive substance. More in detail, in the conventional autoradiography, the above-mentioned exposing procedure is performed at a low temperature (for instance, in the vicinity of 0° C., or −70° C. to −90° C. in the course of the base-sequencing of a nucleic acid) for a long period of time (for instance, several days). The reasons why these conditions are involved are that a long exposure time is required to attain an appropriate exposure because generally a sample subjected to the autoradiography is not provided with high radioactivity, and also because the photosensitive silver salt of the radiographic film is chemically fogged by various substances contained in the sample when the film is kept at a relatively high temperature such as room temperature for a long period of time during the exposure, resulting in difficulty of obtaining an exposed image with high accuracy. Thus, the exposure ought to be carried out at a low temperature to depress the chemical fog. It can be considered that a radiographic film be more sensitized to mitigate the severe exposure conditions, but a radiographic film used in the conventional autoradiography is provided already with very high sensitivity and the satisfactory further enhancement in the sensitivity can not be expected if the sharpness of an image to be obtained is taken into consideration.

In the second place, the photosensitive silver salt of a radiographic film has a drawback that it is sensitive not only to the chemical irritation but also to physical impetus, and this drawback brings about difficulty in the autoradiographic procedure and decreases accuracy thereof. More in detail, since the exposing procedure is necessarily carried out keeping a radiographic film in contact with a sample, the radiographic film is generally handled with no protective cover during operations such as transferring and installing operations for the radiographic film. Accordingly, the radiographic film is likely be brought into contact with hands of the operator and tools in the handling, and the physical pressure arising from these contacts causes production of the physical fog on the radiographic film. Thus produced physical fog is also a cause of the decrease of accuracy in the autoradiography. For this reason, the handling of a radiographic film requires well-trained skill and a great caution to avoid the production of the physical fog on the radiographic film, and such careful handling required brings about increases the complexity in the autoradiographic procedure.

In the third place, certain natural radioactive substances contained in the sample in addition to the radioactively labeled substance take part in the exposure of the radiographic film because the exposure is carried out, as described above, for a long time in the conventional autoradiography. Thus, the influence of the natural radioactive substance further reduces the accuracy of locational information on the radioactively labeled substances, and this is another drawback. In order to remove the troublesome noise brought about by the natural radioactive substances, parallel experiments using control samples and a method for optimization of the exposure time have been employed, but these procedures include increased experimental runs for the parallel experiments and requires preliminary experiments to determine the preferable exposure time, and thus the drawback arising from the complicated procedures not avoidable as a whole.

SUMMARY OF THE INVENTION

The present inventors have studied for solving the above-described problems attached to the conventional autoradiography, and discovered that these problems are solved or reduced by using a stimulable phosphor sheet having a phosphor layer comprising a stimulable phosphor dispersed in a binder as the radiosensitive material in place of the conventional radiographic film. The present invention has been completed upon the discovery.

More in detail, it has been discovered that the employment of a stimulable phosphor sheet having a phosphor layer comprising a stimulable phosphor dispersed in a binder as the radiosensitive material for obtaining the locational information on the radioactively labeled substances contained in a sample in the autoradiography, makes it possible not only to greatly shorten the exposure time required, but also to obtain an accurate locational information on the radioactively labeled substances in the sample even under the conditions that the exposure is performed at a relatively high temperature such as an ambient temperature or a temperature in the vicinity of the ambient temperature. This fact greatly simplifies the exposing procedure adopted in the conventional autoradiography which has been carried out under chilled conditions. Since the exposure time can be greatly shortened, the autoradiographic procedure can be carried out efficently in a very short time as a whole. This feature is also very advantageous in the practical operations.

Further, by the employment of the stimulable phosphor sheet in the autoradiography as the radiosensitive material, neither the chemical fog nor the physical fog, both of which bring about the unavoidable problems in the use of the a conventional radiographic film, is produced on the obtained image. This also provides an advantageous feature in the improvement of the accuracy and workability of the autoradiography.

Furthermore, in the case of using the stimulable phosphor sheet as the radiosensitive material, the visualization is not always required to obtain the information on the location of the radioactively labeled substance copied from the sample, that is, the locational information can be obtained in desired forms such as a visible image, symbols, numerical values and combinations thereof, by scanning the phosphor sheet with an electromagnetic wave to release at least a portion of radiation energy stored in said phosphor sheet as stimulated emission, and detecting the stimulated emission to obtain locational information on the radioactively labeled substances in the sample. It is also possible to obtain the required information in desired various forms by further processing the above-mentioned locational information using an appropriate electric means.

It is furthermore possible to easily reduce or eliminate the disadvantageous effect which decreases the accuracy such as caused by the presence of the natural radioactive substances in a sample by applying a certain electric processing to the locational information.

Accordingly, the present invention provides an autoradiographic process for obtaining locational information on radioactively labeled substances contained in a sample selected from the group consisting of tissue of an organism and a medium containing tissue of an organism and/or substances originating from an organism, which comprises:

placing said sample and a stimulable phosphor sheet having a phosphor layer comprising a stimulable phosphor dispersed in a binder together in layers for a certain period of time to cause said phosphor sheet to absorb at least a portion of radiation energy emitted by the radioactively labeled substances in said sample;

scanning said phosphor sheet with an electromagnetic wave to release at least a portion of radiation energy stored in said phosphor sheet as stimulated emission; and detecting the stimulated emission to obtain one or two dimensional information on the location of radioactively labeled substances in the sample.

Further, the present invention provides a process for obtaining the information on the location of the radioactively labeled substance in the sample as obtained above, in the form of a visible image or an information expressed in the form of symbol and/or numerical value.

The autoradiographic process provided by the present invention is very advantageously applied to an autoradiographic process for obtaining locational information on radioactively labeled organism-originating substances resolved on a support or medium. This process can be carried out using:

a kit comprising a support for resolving organism-originating substances labeled with a radioactive element and a stimulable phosphor sheet having a phosphor layer comprising a stimulable phosphor dispersed in a binder; or a kit comprising a stimulable phosphor sheet having a phosphor layer comprising a stimulable phosphor dispersed in a binder and a medium for resolving organism-originating substances labeled with a radioactive element provided on the stimulable phosphor sheet, that is, an integrated kit.

DETAILED DESCRIPTION OF THE INVENTION

Figure 1:
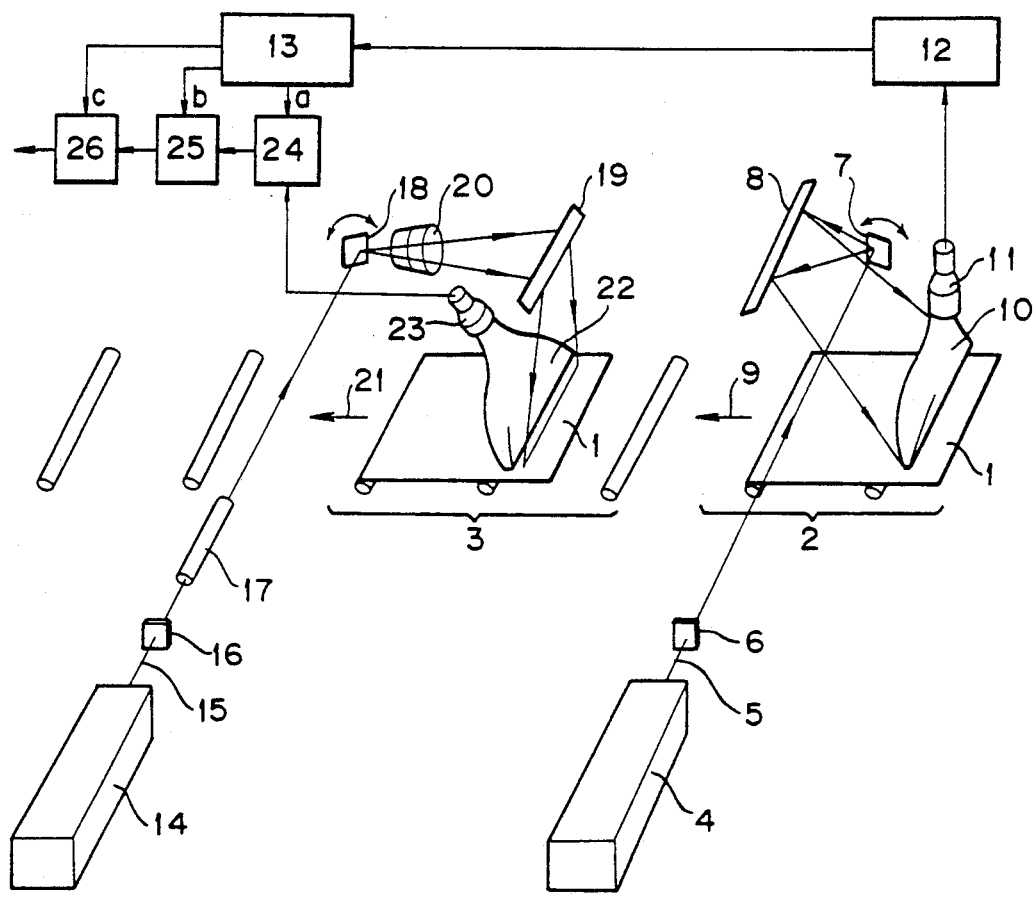
FIG. 1 shows an example of the read-out system for reading out the locational information of the radioactively labeled substance copied from the sample and stored in a stimulable phosphor sheet in accordance with the present invention.

The stimulable phosphor sheet employed in the present invention has been alternatively mentioned in the name of a radiation image storage panel, and described in, for instance, U.S. Pat. No. 4,239,968. Accordingly, the general constitution of the stimulable phosphor sheet is already known. The stimulable phosphor sheet is used to record and reproduce the image produced by the radiation energy having passed through an object for diagnosis purpose, as described in the above-mentioned patent.

The process comprises steps of: causing the stimulable phosphor of the phosphor sheet to absorb a radiation energy having passed through an object; exciting the stimulable phosphor with an electromagnetic wave such as visible light or infrared rays (hereinafter referred to as "stimulating rays") to sequentially release the radiation energy stored in the stimulable phosphor as light emission; photoelectrically detecting the emitted light to give an electric signal; and reproducing the electric signal in the form of a visible image on a recording material such as a photosensitive film or on a display device.

The stimulable phosphor sheet preferably employed in the autoradiography of the present invention is described briefly in the following.

The stimulable phosphor sheet has a basic structure comprising a substrate and a phosphor layer provided on one surface of the substrate. Further, a transparent film is generally provided on the free surface (surface not facing the substrate) of the phosphor layer to keep the phosphor layer from chemical deterioration or physical shock.

The phosphor layer comprises a binder and a stimulable phosphor dispersed therein. When excited with an electromagnetic wave such as visible light or infrared rays after having been exposed to a radiation, the stimulable phosphor emits light (stimulated emission). Accordingly, a radiation having been radiated from a sample containing the radioactively labeled substances, for instance, is absorbed by the phosphor layer of the stimulable phosphor sheet in proportion to the applied radiation dose, and a radiation image of the object is stored in the stimulable phosphor sheet in the form of a radiation energy-stored image. The stored image can be released as stimulated emission (light emission) by applying an electromagnetic wave such as visible light or infrared rays (stimulating rays) onto the stimulable phosphor sheet. The stimulated emission is then photoelectrically detected to convert it to electric signals, and thus the radiation energy-stored image can be converted to a visible image or numerical value and/or symbol which represent the locational information on the radioactive substance, namely, the radioactively labeled substance.

A material of the substrate of the stimulable phosphor sheet employed in the present invention can be selected from those employed in the conventional radiographic intensifying screens. Examples of the substrate material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From a viewpoint of characteristics of a stimulable phosphor sheet as the information recording material, a plastic film is preferably employed as the substrate material of the invention. The plastic film may contain a light-absorbing material such as carbon black, or may contain a light-reflecting material such as titanium dioxide. The former is appropriate for a high sharpness type stimulable phosphor sheet, while the latter is appropriate for a high sensitivity type stimulable phosphor sheet.

In the preparation of a known stimulable phosphor sheet, one or more additional layers are occasionally provided between the substrate and the phosphor layer, so as to enhance the adhesion between the substrate and the phosphor layer, or to improve the sensitivity of the sheet or the quality of an image provided thereby. For instance, a subbing layer or an adhesive layer may be provided by coating a polymer material such as gelatin over the surface of the substrate on the phosphor layer side. Otherwise, a light-reflecting layer or a light-absorbing layer may be provided by forming a polymer material layer containing a light-reflecting material such as titanium dioxide or a light-absorbing material such as carbon black. One or more of these additional layers may be provided depending on the type of the stimulable phosphor sheet to be obtained.

As described in Japanese Patent Application No. 57(1982)-82431 (which corresponds to U.S. patent application Ser. No. 496,278 now U.S. Pat. No. 4,575,635, the whole content of which is described in European Patent Publication No. 92241), the phosphor layer side surface of the substrate (or the surface of an adhesive layer, light-reflecting layer, or light-absorbing layer in the case where such layers provided on the phosphor layer) may be provided with protruded and depressed portions for enhancement of the sharpness of radiographic image, and the constitution of those protruded and depressed portions can be selected depending on the purpose of the stimulable phosphor sheet to be prepared.

Onto the above-mentioned substrate, a phosphor layer is provided. The phosphor layer comprises basically a binder and stimulable phosphor particles dispersed therein.

The stimulable phosphor, as described hereinbefore, gives stimulated emission when excited by stimulating rays after exposure to a radiation. From the viewpoint of practical use, the stimulable phosphor is desired to give stimulated emission in the wavelength region of 300-500 nm when excited by stimulating rays in the wavelength region of 400-850 nm.

Examples of the stimulable phosphor employable in the stimulable phosphor sheet utilized in the present invention include:

SrS:Ce,Sm, SrS:Eu,Sm, ThO$_2$:Er, and La$_2$O$_2$S:Eu,Sm, as described in U.S. Pat. No. 3,859,527;

ZnS:Cu,Pb, BaO·xAl$_2$O$_3$:Eu, in which x is a number satisfying the condition of $0.8 \leq \times \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq \times \leq 2.5$, as described in U.S. Pat. No. 4,326,078;

(Ba$_{1-x-y}$,Mg$_x$,Ca$_y$)FX:aEu$^{2+}$, in which X is at least one element selected from the group consisting of Cl and Br, x and y are numbers satisfying the conditions of $0 < \times + y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < \times < 0.1$, as described in the above-mentioned U.S. Pat. No. 4,236,078;

(Ba$_{1-x}$,M$^{II}_x$)FX:yA, in which II M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq \times \leq 0.6$ and $0 \leq y \leq 0.2$, respectively as described in Japanese Patent Provisional Publication No. 55(1980)-12145;

M$^{II}$FX·xA:yLn, in which M$^{II}$ is at least one element selected from the group consisting of Ba, Ca, Sr, Mg, Zn and Cd; A is at least one compound selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leq \times \leq 0.5$ and $0 < y \leq 0.2$, respectively, as described in Japanese Patent Provisional Publication No. 55(1980)-160078;

(Ba$_{1-x}$,M$^{II}_x$)F$_2$·aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq \times \leq 1$, $10^{-6} \leq y \leq 2 \times 10^{-1}$, and $0 < z \leq 10^{-2}$, respectively, as described in Japanese Patent Provisional Publication No. 56(1981)-116777;

(Ba$_{1-x}$,M$^{II}_x$)F$_2$·aBaX$_2$:yEu,zB, in which M$^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq \times \leq 1$, $10^{-6} \leq y \leq 2 \times 10^{-1}$, and $0 < z \leq 2 \times 10^{-1}$, respectively, as described in Japanese Patent Provisional Publication No. 57(1982)-23673;

(Ba$_{1-x}$,M$^{II}_x$)F$_2$·aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq \times \leq 1$, $10^{-6} \leq y \leq 2 \times 10^{-1}$, and $0 < z \leq 5 \times 10^{-1}$, respectively, as described in Japanese Patent Provisional Publication No. 57(1982)-23675;

M$^{III}$OX:xCe, in which MIII is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < \times < 0.1$, as described in Japanese Patent Application No. 56(1981)-167498;

Ba$_{1-x}$M$_{x/2}$L$_{x/2}$FX:yEu$_{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y < = 0.1$, respectively, as described in Japanese Patent Application No. 57(1982)-89875;

BaFX.xA:yEu$^{2+}$, in which X is at least one halogen selected from the group consisting of Cl, Br and I; A is at least one fired product of a tetrafluoro boric acid compound; and x and y are numbers satisfying the conditions of $10^{-6}$ and $0 < y \leq 0.1$, respectively, as described in Japanese Patent Application No. 57(1982)-137374;

BaFX.xA:yEu$^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in Japanese Patent Application No. 57(1982)-158048;

BaFX.xNaX':aEu$^{2+}$, in which each of X and X' is at least one halogen selected from the group consisting of Cl, Br and I; and x and a are numbers satisfying the conditions of $0 < x \leq 2$ and $0 < a \leq 0.2$, respectively, as described in Japanese Patent Application No. 57(1982)166320;

M$^{II}$FX.xNaX':yEu$^{2+}$:zA, in which M$^{II}$ is at least one alkaline earth metal selected from the group consisting of Ba, Sr and Ca: each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in Japanese Patent Application No. 57(1982)-166696; and M$^{II}$FX.aM$^{I}$X'.bM'$^{II}$X''$_2$.cM$^{III}$X'''$_3$.xA:yEu$^{2+}$, in which M$^{II}$ is at least one alkaline earth metal selected from the group consisting of Ba, Sr and Ca; M$^{I}$ is at least one alkali metal selected from the group consisting of Li, Na, K, Rb and Cs; M'$^{II}$ is at least one divalent metal selected from the group consisting of Be and Mg; M$^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 - b \leq 10^{-2}$, $0 \leq c \leq 10^{-2}$ and $a + b + c \leq 10^{-6}$; and x and y are numbers satisfying the conditions of $0 < x \leq 0.5$ and $0 < y \leq 0.2$, respectively, as described in Japanese Patent Application No. 57(1982)-184455.

The above-described stimulable phosphor are given by no means to restrict the stimulable phosphor employable in the present invention. Any other phosphors can be also employed, provided that the phosphor gives stimulated emission when excited with stimulating rays after exposure to a radiation.

In carrying out the autoradiographic process of the present invention, a divalent europium-activated alkaline earth metal fluorohalide stimulable phosphor is preferably employed.

Examples of the binder to be contained in the phosphor layer include: natural polymers such as proteins (e.g., gelatin), polysaccharides (e.g., dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the substrate, for instance, by the following procedure.

In the first place, stimulable phosphor particles and a binder are added to an appropriate solvent (for example, lower alcohol, chlorinated hydrocarbon, ketone, ester, or ether), and then they are mixed to prepare a homogeneous coating dispersion of the phosphor particles in the binder solution.

The ratio between the binder and the stimulable phosphor in the coating dispersion may be determined according to the characteristics of the aimed stimulable phosphor sheet and the nature of the phosphor employed. Generally, the ratio therebetween is within the range of from 1 : 1 to 1:100 (binder : phosphor, by weight), preferably from 1:8 to 1:40.

The coating dispersion may contain a dispersing agent to increase the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of the substrate to form a layer of the coating dispersion. The coating procedure can be carried out by a conventional method such as a method using a doctor blade, a roll coater or a knife coater.

After applying the coating dispersion to the substrate, the coating dispersion is then heated slowly to dryness so as to complete the formation of a phosphor layer. The thickness of the phosphor layer varies depending upon the characteristics of the aimed stimulable phosphor sheet, the nature of the phosphor, the ratio between the binder and the phosphor, etc. Generally, the thickness of the phosphor layer is within a range of from 20 $\mu$m to 1 mm, preferably from 50 to 500 $\mu$m.

The phosphor layer can be provided onto the substrate by the methods other than that given in the above. For instance, the phosphor layer is initially prepared on a sheet (false substrate) such as a glass plate, a metal plate or a plastic sheet using the aforementioned coating dispersion and then thus prepared phosphor layer is overlaid on the genuine substrate by pressing or using an adhesive agent.

As described above, a protective film are preferably provided on the phosphor layer. The protective film is generally prepared from a transparent cellulose derivative such as cellulose acetate or nitrocellulose; or a transparent synthetic polymer such as polymethyl methacrylate, polyvinyl butyral, polyvinyl formal, polycarbonate, polyvinyl acetate, vinyl chloride-vinyl acetate copolymer, polyethylene terephthalate, polyethylene, polyvinylidene chloride or polyamide. The protective film preferably has a thickness within the range of 0.1–100 μm, and more preferably within the range of 0.3–50 μm.

The present invention employs the stimulable phosphor sheet having the above-described constitution as the radiosensitive material in the autoradiography in place of the conventional radiographic film. The exposing procedure of the invention can be done by placing the stimulable phosphor sheet and a sample containing a radioactively labeled substance together in layers for a certain period of time so as to have at least a portion of a radiation emitted by the radioactively labeled substances in the sample absorbed by the stimulable phosphor sheet.

The sample to be subjected to the autoradiographic process of the invention is, as described hereinbefore, selected from the group consisting of tissue of an organism and a medium containing tissue of an organism or substances originating from an organism, and the locational information on the radioactively labeled substances contained in the sample is detected using the stimulable phosphor sheet.

The present invention is particularly useful when applied to a medium containing tissue of an organism and/or substances originating from an organism.

More particularly, the present invention is of great value when applied to a medium (or support) on which radioactively labeled organism-originating substances such as biopolymers, derivatives thereof or cleavage products thereof provided with a radioactive label have been resolved (or developed). Examples of the biopolymers include polymeric substances such as proteins, nucleic acids, their derivatives, and their cleavage products. The present invention can be used very effectively, for instance, to analyze the whole or partial molecular structures of these biopolymers and their basic segmental constitutions.

Representative examples of the method for resolving (or developing) the radioactively labeled substances on a medium include an electrophoresis using one of various resolving mediums such as a gel in the form of layer, column or the like, a molded polymeric film such as a cellulose diacetate film, and a filter paper, and a thin layer chromatography using a support of material such as silica gel. However, the method employable in the invention is by no means restricted to these methods.

When the autoradiographic process of the present invention is applied to obtain the locational information on radioactively labeled substances resolved on a medium, the resolving process can be carried out on an independently prepared medium such as a self-supporting medium. The independently prepared medium can be encased or supported by an accessory means such as glass plate or plastic sheet.

Accordingly, the independently prepared medium and the stimulable phosphor sheet may be prepared for use in a kit. In the kit, the medium can be preserved in dry state or wet state containing a certain resolving solvent.

Otherwise, the medium and the stimulable phosphor sheet can be united to prepare an integrated kit. The integrated kit can be employed in such a manner that the resolving process is performed on the medium provided on the stimulable phosphor sheet, the kit is then allowed to stand for a certain period of time for exposure, the medium may be removed from the exposed stimulable phosphor sheet, and then the phosphor sheet is subjected to a read-out process through stimulation thereof. By the employment of the integrated kit in the autoradiographic process of the invention, the period required for carrying out the process can be further shortened.

Figure 2:
FIGS. 2(a), (b), (c) and (d) shows typical embodiments of the kits of integrated types in accordance with the present invention.
Figure 2:
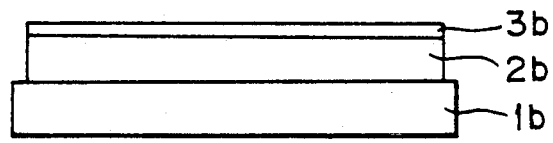
Figure 2:
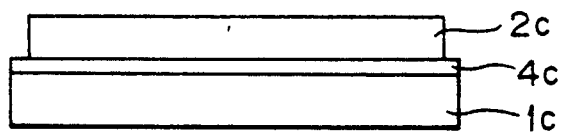
Figure 2:
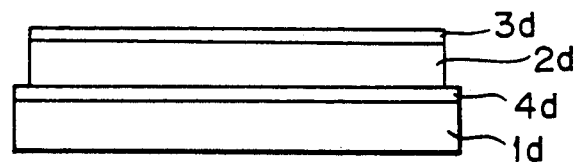

Typical embodiments of the integrated kits employable in the autoradiographic process of the present invention are illustrated in FIG. 2, in which:

a kit identified by (a) comprises a stimulable phosphor sheet (1a) and a resolving medium (medium for resolution, 2a) provided thereon;

a kit identified by (b) comprises a stimulable phosphor sheet (1b), a resolving medium (2b) provided thereon, and a covering material (3b) provided on the resolving medium;

a kit identified by (c) comprises a stimulable phosphor sheet (1c), a hydrophilic layer (4c) provided thereon; and a resolving medium (2c) provided on the hydrophilic layer; and a kit identified by (d) comprises a stimulable phosphor sheet (1d), a hydrophilic layer (4d) provided thereon, a resolving medium (2d) provided on the hydrophilic layer, and a covering material (3d) provided on the resolving medium.

In the embodiments of the kit, the coverage of the resolving medium may be applied to the free surface (not facing the stimulable phosphor sheetd) and/or the side face. The hydrophilic layer may be formed independently or by activating the surface of the stimulable phosphor sheet.

The support (or medium) having the radioactively labeled substances resolved thereon is temporarily combined as such or after optionally subjected to drying treatment or treatment for fixing the resolved substances, with the stimulable phosphor sheet, to carry out the exposing procedure.

In carrying out the above-mentioned exposing procedure, the temporary combination of the sample with the stimulable phosphor sheet is generally done by placing the sample in close contact with the phosphor sheet, but the contact is not required to be so close, and the exposure can be accomplished by keeping the phosphor sheet in a position adjacent to the sample. If the above-mentioned integrated kit is employed, the procedure for placing the sample and the stimulable phosphor sheet together in layers is not required.

The exposure time varies depending on the radioactivity of the radioactively labeled substance in the sample, the concentration and density of said substance, the sensitivity of the stimulable phosphor sheet, and the distance between the sample and the stimulable phosphor sheet, but in general the exposure is required to be done for a certain period of time, for instance, more than several seconds. In the case of employing the stimulable phosphor sheet as the radiosensitive material according to the present invention, however, the exposure time can be greatly reduced as compared with the exposure time required in the case employing the conventional radiographic film. Further, a precise control of the exposure time is not required in the case of employing the stimulable phosphor sheet, because the locational information of the radioactively labeled substances in the sample which has been copied from the sample through the exposing procedure can be electrically processed depending upon intensity of energy, and distribution of the stored energy.

There is no specific limitation on the temperature for carrying out the exposing procedure, but it is advantageously characteristic aspect attached to the employment of the stimulable phosphor sheet in the autoradiography according to the present invention, that the exposure can be performed at an ambient temperature such as a temperature within 10°–35° C. The exposure may be carried out, however, even at a low temperature, for instance, in the vicinity of 5° C. or lower as adopted in the conventional autoradiography.

A method for reading out the locational information of the radioactively labeled substances in the sample copied and stored in the stimulable phosphor sheet according to the invention will be described briefly, referring to an embodiment of a read-out system shown in FIG. 1 of the accompanying drawings.

FIG. 1 schematically illustrates an embodiment of the read-out system comprising a preliminary read-out section 2 for preliminarily reading out the one or two dimensional information on the location of the radioactively labeled substances stored (or recorded in the stimulable phosphor sheet 1 (from which the sample generally has been removed, the stimulable phosphor sheet is hereinafter referred to as "phosphor sheet"), and a final read-out section 3 for finally reading out the desired locational information on the radioactively labeled substance stored in the phosphor sheet 1.

In the preliminary read-out section 2, the preliminary read-out operation is carried out in the following manner.

Laser beam 5 generated by a laser source 4 first passes through a filter 6 to cut off a light beam in the wavelength region corresponding to the wavelength region of stimulated emission to be emitted from the phosphor sheet 1 in response to stimulation with the laser beam 5. The laser beam 5 is subsequently deflected by a beam deflecter 7 such as a galvanometer mirror, and reflected by a plane reflecting mirror 8. The deflected beam then impinges upon the phosphor sheet 1. The laser source 4 used herein is so selected as to avoid overlapping of the wavelength region of the laser beam 5 with the main wavelength region of the stimulated emission to be emitted from the phosphor sheet 1.

The phosphor sheet 1 is transferred to the direction along the arrow 9 under the irradiation of the above-mentioned deflected laser beam. Therefore, the whole surface of the phosphor sheet 1 is subjected to the irradiation of the deflected laser beam. The power of the laser beam 5 employed in the preliminary read-out section is adjusted to be lower than the power of the laser beam to be employed in the final read-out section by controlling the output of the laser source 4, the beam diameter of the laser beam 5, the scanning speed of the laser beam 5, and the transferring speed of the phosphor sheet 1.

When irradiated with the above-mentioned laser beam, the phosphor sheet i gives the stimulated emission having the emission intensity proportional to the radiation energy stored (or recorded) therein. The emission then enters into a light guiding sheet 10 for the preliminary readout. The light guiding sheet 10 has a linear edge face for receiving the emmision, and the edge face is so positioned in the vicinity of the phosphor sheet as to correspond to the scanning line on the phosphor sheet 1. The exit of the light guiding sheet 10 is in the form of a ring and is connected to an light-receiving face of a light detector 11 such as a photomultiplier. The light guiding sheet 10 is made, for instance, by processing a sheet of a transparent thermoplastic resin such as an acrylic synthetic resin, and so constituted that the emission introduced from the linear edge face is transmitted to the exit under repeated total reflection within the sheet 10. The stimulated emission from the phosphor sheet 1 is guided in the interior of the light guiding sheet 10 to the exit, and received by the light detector 11.

The preferable shape and material of the light guiding sheet is disclosed in Japanese Patent Provisional Publications No. 55(1980)-87070 and No. 50(1981)-11397, etc.

On the light-receiving face of the light detector 11 is provided a filter which allows only the light of wavelength region of the stimulated emission to pass through and cuts off the light of the wavelength region of the stimulating rays (laser beam) so as to detect only the stimulated emission. The stimulated emission detected by the light detector 11 is converted to an electric signal, amplified in an amplifier 12 and transmitted to the output. The stored information output from the amplifier 12 is supplied to a control circuit 13 of the final read-out section 3. The control circuit 13 provides an amplification degree setting value a, a scale factor setting value b, and an image processing condition setting value c so that a well readable image having even concentration and contrast can be obtained regardless of variation of the detected information.

The phosphor sheet 1 having been subjected to the preliminary read-out in the above-described manner is then transferred to the final read-out section S.

In the final read-out section S, the following readout operation is performed.

The laser beam 15 generated by a laser source 14 for the final read-out passes through a filter 16 having the same function as that of the above-mentioned filter 0, and then the beam diameter is precisely adjusted in a beam expander 17. Subsequently, the laser beam is deflected by a beam deflector 18 such as a galvanometer mirror, and reflected by a plane reflection mirror 19. The deflected beam then impinges one-dimensionally upon the phosphor sheet 1. Between the beam deflector 18 and the plane reflection mirror 19 a $f\theta$ lens 20 is provided so that the beam speed is continuously kept constant when the deflected laser beam is scanned on the phosphor sheet 1.

The phosphor sheet 1 is transferred in the direction along the arrow 21 under the irradiation with the above-mentioned deflected laser beam. Accordingly, the whole surface of the phosphor sheet is subjected to the irradiation in the same manner as in the preliminary read-out operation.

When irradiated with the above-mentioned laser beam, the phosphor sheet 1 gives the stimulated emission in proportion to the radiation energy stored therein in the same manner as in the preliminary read-out operation. The emission then enters into a light guiding sheet 22 for the final read-out. The light guiding sheet 22 for the final read-out is of the same material and has the same constitution as the light guiding sheet 10 employed for the preliminary read-out. The stimulated emission received is guided in the interior of the light guiding sheet 22 up to the exit under repeated total reflection, and then received by a light detector 23. On the light-receiving face of the light detector 23 is provided a filter which allows only the light of wavelength region of the stimulated emission to pass through and cuts off the light of the wavelength region of the stimulating rays (laser beam) so as to detect only the stimulated emission. The stimulated emission detected by the light detector 23 is converted to an electric signal, amplified to an electric signal adjusted to an appropriate level in an amplifier 24 according to the aforementioned amplification degree setting value a and transmitted to an A/D converter 25. The adjusted electric signal is then converted to a digital signal in the A/D converter 25 according to an appropriate scale facter defined by the scale factor setting value b, and supllied to a signal processing circuit 26. In the circuit 26, the digital signal is so processed according to the image processing condition setting value c as to give a well readable visible image having well adjusted concentration and contrast, and then transmitted to a recording device (not shown), optionally upon storage in a storing means such as a magnetic tape.

Various recording devices based on various systems can be employed for the above-described purpose, for instance, a device for visualizing optically by scanning on a lightsensitive material with laser beam, etc., a display means for visualizing electrically on CRT, etc., a means for printing a radiation image displayed on CRT by means of a video printer, and a means for visualizing on heat-sensitive recording material using thermic rays.

The recording device employable in the invention is not restricted to the visualizing devices such as above, and the one or two dimensional information on the location of the radioactively labeled substances in a sample may be recorded or produced, for instance, in the form of numeral and/or symbol.

In the above description on the method for reading out the locational information on the radioactively labeled substance copied and stored in the stimulable phosphor sheet, a read-out operation involving both the preliminary read-out operation and the final read-out operation has bee given. However, the read-out operation employable in the present invention is not limited to the above-described embodiment. For instance, the preliminary read-out operation may be omitted if the content of the radioactive substance in the sample and an adequate exposure time for the sample is previously known.

Further, it is natural that other suitable methods than the above-mentioned embodiments may be used for reading out the locational information of the radioactively labeled substances copied from the sample and stored in the stimulable phosphor sheet.

In the present invention, the term "locational information" of the radioactively labeled substance means to include a variety of information relating to the location of the radioactively labeled substances, or the aggregation thereof, being present in the sample, such as the location, the shape, the concentration, the distribution combination of thereof.

The present invention will be further described by the following example, in which an embodiment of the procedure for sequencing a certain DNA according to the Maxam-Gilbert method. The base sequence of the DNA (plasmid DNA of Escherichia coli, pBR S22) used in the following example and comparison example had been already known, and the evaluation and analysis of obtained result was performed in comparison with the known data.

The stimulable phosphor sheet used in the following example was prepared by the following method.

To a mixture of a particulated europium activated barium fluorobromide stimulable phosphor (BaFBr:Eu) and a linear polyester resin were added successively methyl ethyl ketone and nitrocellulose (nitrification degree: 11.5%), to prepare a dispersion containing the phosphor particles. Subsequently, tricresyl phosphate, n-butanol and methyl ethyl ketone were added to the resulting dispersion. The mixture was sufficiently stirred by means of a propeller agitater to obtain a homogeneous coating dispersion having a viscosity of 25-35 PS (at 25° C.).

The coating dispersion was applied to a polyethylene terephthalate sheet containing carbon black (substrate, thickness: 250 μm) placed horizontally on a glass plate. The application of the coating dispersion was carried out using a doctor blade. The substrate having a layer of the coating dispersion was then placed in an oven and heated at a temperature gradually rising from 25° to 100° C. Thus, a phosphor layer having thickness of 300 μm was formed on the substrate.

On the phosphor layer was placed a polyethylene terephthalate transparent film (thickness: 12 μm; provided with a polyester adhesive layer on one surface) to combine the film and the phosphor layer with the adhesive layer.

Thus, a stimulable phosphor sheet comprising a substrate, a phosphor layer, and a protective film was prepared.

EXAMPLE 1

(1) Separation of DNA to be Sequenced and Labeling with Radioactive Element

Plasmid DNA of *E. coli.* (pBR 322) was cleaved by the use of restriction enzyme Hind-III by the known method, and 5'-end thereof was labeled with $^{32}P$ to obtain 1 μg. of a double helix DNA ($^{32}P$-labeled substance).

The double helix DNA (1 μg.) and approx. 1 unit of the restriction enzyme Hae-III were added to 20 μl. of 20 mM of tris[tris(hydroxymethyl)aminomethane]- hydrocholoric acid buffer solution (pH 7.4) containing 5 mM of magnesium chloride and 1 mM of dithiothreitol. The resulting mixture was maintained at 37° C. for one hour to perform the specific cleavage reaction to obtain a cleaved mixture solution containing cleavage products.

The cleaved mixture solution was charged on a slab gel (1.5 mm×200 mm×200 mm) containing 8% of polygel acrylamide (cross-linking agent content: 3%), and electrophoresed using 50 mM tris - borate buffer solution (pH 8,3) containing 1 mM of EDTA as an electrode solution at voltage of 500V. The electrophoresis was continued until the marker dye (Bromophenol Blue) added to the sample previously reached the bottom end of the gel, and the starting position of the sample was marked with a $^{32}P$-containing ink.

The gel was laid on the stimulable phosphor sheet and kept at room temperature (approx. 25° C.) for one minute to perform the exposure, and then the stimulable phosphor sheet was placed in a reading-out device as shown in FIG. 1 to obtain the locational information representing positions of the fragments having the $^{32}P$ label, by reading out the distance from the starting position marked with the $^{32}P$-containing ink. According to thus obtained locational information, the portions containing the desired fragments with $^{32}P$ label were cut out of the gel with a thin razor blade, and the gel portion segment was placed in a test tube.

For confirmation, the residual gel (a part of which had been removed as above) was laid on a stimulable phosphor sheet in the same manner, and the reading-out procedure was carried out in the reading-out device to examine absence of the $^{32}$P-labeled fragment (cleavage products). The result of the examination indicated that the $^{32}$P-labeled fragments had been completely removed from the gel. Thus, it was confirmed that the accuracy of the locational information of $^{32}$P-labeled fragments obtained by means of the above-mentioned stimulable phosphor sheet was sufficiently high.

(2) Specific Cleavage of Separated $^{32}$P-Labeled DNA Fragments

The gel portion taken out in the above procedure (1) was extracted by the known method to collect the $^{32}$P-labeled DNA fragments as the extract. The count of thus obtained $^{32}$P-labeled DNA fragments was approx. $1 \times 10^6$ cpm.

The extract was concentrated under vacuum to approx. 10 μl., and the concentrated solution was divided to introduce into four micro tubes (Eppendorf tubes). Each concentrated solution was subjected to a base-specific cleavage reaction according to the Maxam-Gilbert method.

The reaction conditions for the specific cleavage were set to cleave selectively at the constitutinal unit (s) having the following base(s):

1) Guanine (G)
2) Guanine (G)+Adenine (A)
3) Thymine (T)+Cytosine (C)
4) Cytosine (C).

The specific cleavage reaction for cleaving at the above mentioned position 1) for guanine (G) was performed according to the known method as described below, and other specific cleavage reactions for cleaving at the positions 2), 3), and 4) were likewise performed according to the known methods.

5 μl. of the sample (concentrated extract) was added to 200 μl. of 50 mM aqueous sodium cacodylate solution containing 1 mM of EDTA, and the resulting mixture was chilled to 0° C. To the chilled mixture was added 1 μl. of dimethylsulfuric acid and the resulting mixture was warmed to 20° C. for performing the reaction for 15 min. To the reaction solution were added 50 μl. of an aqueous solution containing 1.5M sodium sulfate, 1M mercaptoethyl alcohol and 100 μg/ml of t-RNA and 750 pl. of ethanol, both of which was previously chilled to 0° C. The mixture was sufficiently mixed and chilled to −70° C. for 5 min.

The chilled solution was then centrifuged at 12,000 G and the supernatant was removed. To the precipitate was added 250 μl. of 0.3M aqueous sodium acetate solution chilled to 0° C., so as to dissolve DNA and t-RNA. Subsequently, approx. 750 μl. of ethanol was added to the solution. The resulting solution was centrifuged in the same manner and the supernatant was removed. The DNA and t-RNA were thus rinsed. The precipitate was further rinsed with 1 ml. of ethanol.

Thus obtained precipitate was dried under vacuum for a few min., and 100 pl. of freshly distilled 1M aqueous piperidine solution was added. The resulting mixture was heated to 90° C. for 30 min. for performing the reaction. The reaction solution was freeze-dried to remove piperidine, and then the rinsing procedure comprising rinsing with 10 ul. of water and subsequent freeze-drying was repeated twice.

The freeze-dried sample (cleavage products of the DNA fragments) was dissolved in b 10 μl. of an aqueous solution containing 80% formamide, 10 mM of sodium hydroxide, 1 mM of EDTA, and BPB (Bromophenol Blue: marker dye). The resulting mixture was heated to 90° C. for a few min. and chilled in ice water to prepare a sample solution for electrophoresis.

(3) Preparation of Gel for Electrophoresis 10.69 g. of acrylamide, 0.56 g. of N,N'-methylene bisacrylamide, 37.8 g. of urea, and 9 ml. of 1.0M triborate buffer solution (pH 8.3) containing 20 mM of EDTA were dissolved in distilled water to prepare 90 ml. of a gel solution. Nitrogen gas was passed into the gel solution to remove oxygen, and 600 ul. of 10% aqueous ammonium persulfate solution and 25 pl. of TEMED (tetramethylethylene diamine) catalyst were added to the gel solution. Thus treated gel solution was poured into a mold (0.5 mm × 300 mm × 400 mm) which was constructed with sufficiently cleaned two glass plates with thickness of 3 mm. A slot former for forming four slots (0.5 mm × 15 mm × 20 mm each) was placed on the gel solution from the upper end, and the gel solution was then allowed to stand overnight to complete the gelation. Thus a gel having four slots for electrophoresis was prepared.

(4) Electrophoresis

The gel having the slots were placed in an electrophoresis apparatus, and a preliminary run was carried out at 1,000V/40 cm for approx. 180 min. (preliminary electrophoresis).

Subsequently, 1: (G) specific cleavage products, 2: (G+A) specific cleavage products, 3: (T+C) specific cleavage products, and 4: (C) specific cleavage products were introduced into the first slot, second slot, third slot, and fourth slot, respectively, in such a manner that the count of $^{32}$P was adjusted to approx. $2 \times 10^5$ for every slot. The electrophoresis on the samples was then carried out at 1,000V/40 cm. The electrophoresis was continued until the maker dye reached the bottom of the gel, and then terminated. One glass plate was removed, and the gel was rinsed twice in a 10% acetic acid. The rinsed gel was transferred onto a filter paper and heated to dryness under vacuum on the paper.

(5) Exposure procedure

The dry gel obtained as above and a stimulable phosphor sheet were placed together in layers in a cassette, and the stimulable phosphor sheet was exposed to the gel at room temperature (approx. 20° C.) for 40 min. The phosphor sheet was then placed in the read-out device of FIG. 1 to read out four autoradiograms representing the location of the radioactively labeled substances on the gel copied from the sample and stored on the phosphor sheet. The read-out information was recorded in the form of digital information.

A visualizing procedure was applied to the above-mentioned digital information to give a sharp image corresponding to the autoradiogram. Upon comparison, it was confirmed that thus obtained autoradiogram agreed well with the known autoradiogram of the same plasmid DNA of *E. coli* (pBR 322).

The determination of the base sequence of the DNA fragment was performed by reading out the autoradiogram four slots and comparing each autoradiogram with the reference scale which was obtained from those of the second and third slots in the following manner.

The autoradiogram of the (G+A) specific cleavage products in the second slot was compared with the autoradiogram of the (G) specific cleavage products in the first slot, and the location of G and A counting from the starting position were determined, respectively.

Then, the autoradiogram of the (T+A) specific cleavage products of the third slot was compared with the autoradiogram of the (C) specific cleavage products starting from the fourth slot, and the location of T and C counting from the base position were determined, respectively.

The total base sequence was determined by arranging each band in accordance with the distance from the base position.

The base sequence determined as above using a computer well agreed with the known base sequence of the same plasmid DNA of Escherichia coli (pBR 322).

From the above-described results, it was confirmed that the determination of base sequence of DNA according to the Maxam-Gilbert method could be satisfactorily attained by using the stimulable phosphor sheet and exposing the phosphor sheet at room temperature for a short period.

COMPARISON EXAMPLE 1

The exposure procedure was performed using a dried gel obtained through the electrophoress described in "(5) Exposure Procedure" of Example 1 and a combination of an X-ray film (RX-type: produced by Fuji Photo Film Co., Ltd., Japan) with an intensifying screen (Lightening Plus: produced by Du Pont (E I ) de Nemours & Co. U.S.A) in place of the stimulable phosphor sheet. The dried gel, the X-ray film and the intensifying screen were placed together in layers in this sequence in a conventional X-ray cassette and kept under the same conditions in Example 1, namely, at room temperature and for 40 min. Then the X-ray film was developed but visible autoradiogram was not obtained.

Alternatively, the above-mentioned exposure procedure was performed according to the conventional Maxam-Gilbert method at −80° C. for 1,000 min., and the X-ray film was developed. A visible autoradiogram of the same sharpness as obtained in Example 1 was obtained. Thus visualized autoradiogram agreed with the visualized autoradiogram obtained in Example 1.

We claim:

1. An autoradiographic process for obtaining locational information on radioactively labeled substances contained in a sample selected from the group consisting of tissue of an organism and a medium containing tissue of an organism and/or substances originating from an organism,
   which comprises:
   placing said sample and a stimulable phosphor sheet having a phosphor layer comprising a stimulable phosphor dispersed in a binder together in a layer at 10°–35° C. for a certain period of time to cause said phosphor sheet to absorb at least a portion of radiation energy emitted by the radioactively labeled substances in said sample;
   scanning said phosphor sheet with visible light or infrared rays to release at least a portion of said radiation energy stored in said phosphor sheet as stimulated emission; and
   detecting the stimulated emission to obtain one or two dimensional information on the location of radioactively labeled substances in the sample.

2. The autoradiographic process as claimed in claim 1, wherein the sample containing radioactively labeled substances is a medium containing radioactively labeled tissue of an organism and/or a radioactively labeled substances originating from an organism.

3. The autoradiographic process as claimed in claim 2, wherein the medium is a support having radioactively labeled substances resolved thereon and said radioactively labeled substances are biopolymers, derivatives thereof, or cleavage products thereof, labeled with a radioactive element.

4. The autoradiographic process as claimed in claim 3, wherein said support is one which carries the radioactively labeled biopolymers electrophoretically resolved thereon.

5. The autoradiographic process as claimed in claim 4, wherein said biopolymers are nucleic acids, derivatives thereof, or cleavage products thereof.

6. The autoradiographic process as claimed in claim 5, which comprises steps of:
   placing a support carrying a mixture of DNA fragments or DNA cleavage products electrophoretically resolved thereon, the mixture being labeled with a radioactive element, and a stimulable phosphor sheet having a phosphor layer comprising a stimulable phosphor dispersed in a binder together in layers for a certain period of time to cause said phosphor sheet to absorb at least a portion of radiation energy emitted by the radioactive element attached to the mixture of DNA fragments or DNA cleavage products,
   scanning said phosphor sheet with visible light or infrared rays to release at least a portion of radiation energy stored in said phosphor sheet as stimulated emission; and
   detecting the stimulated emission to obtain locational information on the DNA fragments or the DNA cleavage products on the support.

7. The autoradiographic process as claimed in any one of claims 1 to 6, wherein said stimulable phosphor sheet comprises a substrate, a phosphor layer comprising a stimulable phosphor dispersed on a binder, and a protective film.

8. A process for obtaining locational information on radioactively labeled substances contained in a sample selected from the group consisting of tissue of an organism and a medium containing tissue of an organism and/or substances originating from an organism,
   which comprises:
   placing said sample and a stimulable phosphor sheet having a phosphor layer comprising a stimulable phosphor dispersed in a binder together in layers at 10°–35° C. for a certain period of time to cause said phosphor sheet to absorb at least a portion of radiation energy emitted by the radioactively labeled substances in said sample;
   scanning said phosphor sheet with visible light or infrared rays to release at least a portion of said radiation energy stored in said phosphor sheet as stimulated emission; and
   detecting the stimulated emission to obtain one or two dimensional information on the location of radioactively labeled substances in the sample;
   and representing the locational information in the form of a visible image.

9. A process for obtaining locational information on radioactively labeled substances contained in a sample selected from the group consisting of tissue of an organism and a medium containing tissue of an organism and/or substances originating from an organism, which comprises:

placing said sample and a stimulable phosphor sheet having a phosphor layer comprising a stimulable phosphor dispersed in a binder together in layers at 10°–35° for a certain period of time to cause said phosphor sheet to absorb at least a portion of radiation energy emitted by the radioactively labeled substances in said sample;

scanning said phosphor sheet with visible light or infrared rays to release at least a portion of said radiation energy stored in said phosphor sheet as stimulated emission;

detecting the stimulated emission to obtain one or two dimensional information on the location of radioactively labeled substances in the sample; and representing the locational information in the form of symbols, numerals, or a combination thereof.

* * * * *